No. 618,507. Patented Jan. 31, 1899.
G. HENDERSON & C. L. HIBBARD.
BICYCLE HOLDER.
(Application filed July 24, 1897.)

(No Model.)

Attest
J. F. Groat,
Jos. Kulicek

Inventor:
George Henderson
Charles L. Hibbard
By J. M. St. John.
Atty.

UNITED STATES PATENT OFFICE.

GEORGE HENDERSON AND CHARLES L. HIBBARD, OF CEDAR RAPIDS, IOWA, ASSIGNORS OF ONE-HALF TO ISAAC B. SMITH AND S. L. DOWS, JR., OF SAME PLACE.

BICYCLE-HOLDER.

SPECIFICATION forming part of Letters Patent No. 618,507, dated January 31, 1899.

Application filed July 24, 1897. Serial No. 645,872. (No model.)

*To all whom it may concern:*

Be it known that we, GEORGE HENDERSON and CHARLES L. HIBBARD, citizens of the United States, residing at Cedar Rapids, in the county of Linn and State of Iowa, have invented certain new and useful Improvements in Bicycle-Holders; and we do hereby declare the following to be a full, clear, and exact description of the invention, such as will enable others skilled in the art to which it appertains to make and use the same.

The object of this invention is to provide a simple automatic device for holding a bicycle in an upright position and locking to a suitable supporting wall or post.

The invention will be hereinafter fully set forth and claimed, reference being had to the accompanying drawings, forming a part of this specification, in which—

Figure 1:
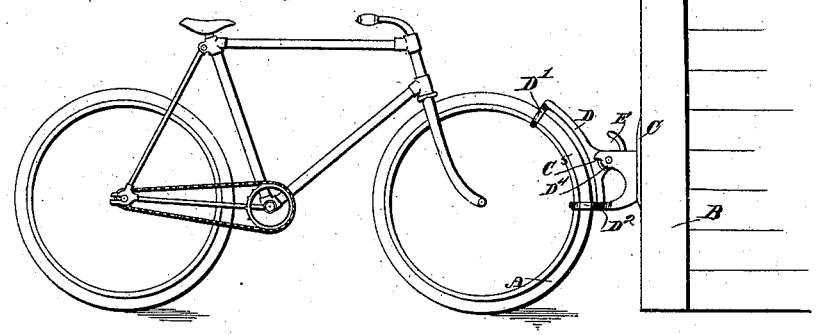
Figure 2:
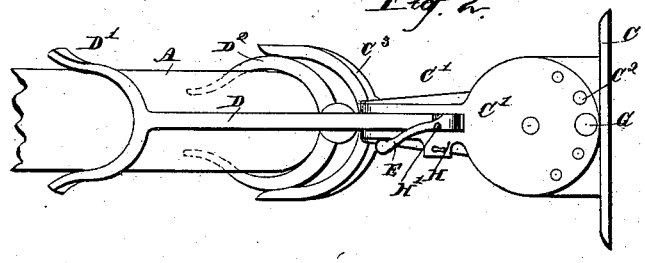
Figure 3:
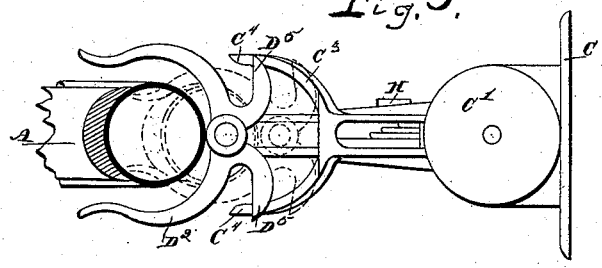
Figure 4:
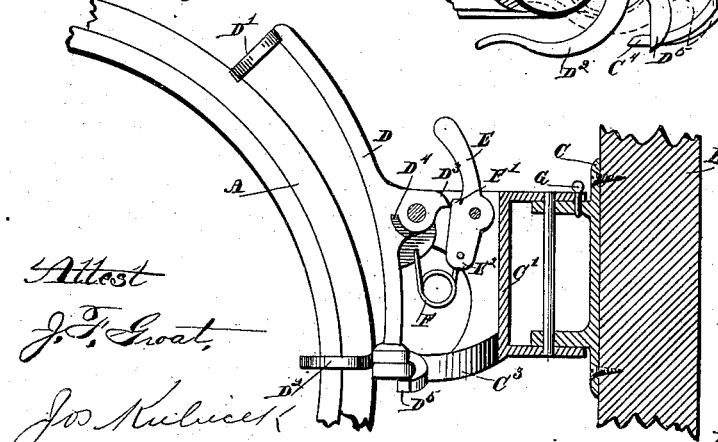

Figure 1 is a side view of the device as in use. Fig. 2 is a top view of the same. Fig. 3 is a bottom view of the same. Fig. 4 is a side view of the same, the supporting-bracket and wall-plate being in central vertical section.

Similar letters of reference indicate corresponding parts.

Referring to the drawings, A is the front wheel of a bicycle, and B a supporting post or wall to which is attached a suitable wall-plate C. To this wall-plate is connected mediately or directly a lever D, which is provided at its extremities with forks D' and $D^2$, adapted to engage the tire of the wheel A. The fork at the upper end of the lever is formed integral with the lever itself and is of suitable width and configuration to inclose the tire, as indicated in Fig. 2. The fork $D^2$ at the lower end of the lever is preferably made in two parts and pivoted to the lower end of the lever, so as to spread outwardly when the wheel is withdrawn and to close up around the tire and rim when the wheel is pushed into it. The lever D is provided near the joint with a shoulder $D^3$, adapted to engage with a similar shoulder E' on a lock-lever E, pivoted to the bracket just back of the lever. A spring F connects the wheel-holding lever D with a lug $E^2$ on the lock-lever and tends to both force the lower end of the wheel-lever outwardly and also to turn the lock-lever to locking position, as will be readily understood. The bracket C', to which the levers are attached, is preferably hinged to the wall-plate C, so as to swing at any desired angle to the wall, and is adapted to be secured at any desired angle by means of a pin G, passing through holes $C^2$ in a semicircular plate adjacent to the hinge of the bracket and wall-plate, as shown in Figs. 2 and 4.

The locking-fork $D^2$ is closed around the tire and rim of the wheel by passing between the arms of a fork $C^3$ at the lower end of the bracket C'. Lateral lugs $D^5$, projecting from the arms of the locking-fork, engage lugs $C^4$, formed on fork $C^3$, when the wheel is withdrawn and spread the fork apart, as shown in Fig. 3.

Near the hinge of the lever D is a lateral lug $D^4$, engaging with a shoulder $C^5$ on the bracket C', and thus limiting the outward throw of the lower end of the lever.

Provision may be made for locking the parts by means of a simple lock H, formed on the bracket C', the bolt H' of which is adapted to engage the back side of the lock-lever E and retain it in locking position.

The operation of the device will be readily understood. Normally the lever D stands in the slightly-inclined position indicated in Fig. 4; but when the wheel A is pushed into the forks of it the periphery of the wheel first engages the locking-fork $D^2$ and pushes it back into the inclosing fork $C^3$, which closes the jaws of the fork $D^2$ around the tire and rim of the wheel. At the same time the lock-lever E engages the shoulder $D^3$ of the lever D, and thus holds it securely in position. To release the wheel, it is but necessary to push back the lever E, when the spring F automatically forces the lever D to normal position, disengaging the wheel.

Having thus described our invention, what we claim as new, and desire to secure by Letters Patent, is—

1. In a bicycle-holder, the combination of a supporting-bracket provided with means for collapsing the expansible jaws of a wheel-holding lever, and a lever pivoted to said bracket, and provided with a fork at each end to engage the wheel-rim, the lower jaws being adapted to automatically open when disengaged from the bracket, and to close partially around and retain the wheel-rim when forced into contact with the bracket, substantially as described.

2. In a bicycle-holder, the combination with a supporting-bracket of a wheel-holding lever having a fork to engage the wheel-rim at each end and pivoted to said bracket, the lower fork being composed of a pair of automatically-expanding jaws, engaging means for collapsing them at the lower end of the bracket, a locking-shoulder formed on said lever, and a lock-lever adapted to engage with said shoulder, substantially as described.

3. In a bicycle-holder, the combination of a wall-plate having a bifurcated lower end, a wheel-holding lever pivoted near the upper end and adapted to swing in a vertical plane, said lever being provided at its upper end with a fork to engage the wheel-tire, a pair of jaws hinged to the lower end of the lever and adapted to close around the tire and rim when forced backwardly between the fork of the wall-plate, and a shoulder on said lever to engage a lock-lever and a lock-lever engaging therewith.

4. In a bicycle-holder, the combination of a bracket, a wheel-holding lever pivoted therein, and having wheel-clamping jaws to engage the wheel when pushed back to holding position, a lock-lever adapted to engage said wheel-holding lever when in holding position, and a spring connecting directly with both levers, and adapted to force the lock-lever into engagement with the wheel-holding lever when in holding position, and the wheel-holding lever out of holding position when disengaged, substantially as described.

In testimony whereof we affix our signatures in presence of two witnesses.

GEORGE HENDERSON.
CHARLES L. HIBBARD.

Witnesses:
J. F. McCORMIC,
GEO. W. NORTON.